US007463870B2

(12) United States Patent
Peusens et al.

(10) Patent No.: US 7,463,870 B2
(45) Date of Patent: Dec. 9, 2008

(54) RECEIVER CIRCUIT AND CONTROL METHOD

(75) Inventors: Herbert Peusens, Brigachtal (DE); Klaus Clemens, Weisweil (DE)

(73) Assignee: Thomson Licensing, Boulogne-Billancourt (FR)

( * ) Notice: Subject to any disclaimer, the term of this patent is extended or adjusted under 35 U.S.C. 154(b) by 396 days.

(21) Appl. No.: 11/190,785

(22) Filed: Jul. 27, 2005

(65) Prior Publication Data

US 2006/0025098 A1 Feb. 2, 2006

(30) Foreign Application Priority Data

Aug. 2, 2004 (DE) ...................... 10 2004 037 637

(51) Int. Cl.
*H04M 1/00* (2006.01)
*H04B 1/18* (2006.01)

(52) U.S. Cl. .................. 455/130; 455/63.4; 455/193.1; 455/575.7

(58) Field of Classification Search ............. 455/77–87, 455/575.7, 193.1–193.3, 269–277.2, 280–293, 455/63.4, 121–123
See application file for complete search history.

(56) References Cited

U.S. PATENT DOCUMENTS

| | | | | |
|---|---|---|---|---|
| 5,301,358 | A * | 4/1994 | Gaskill et al. | 455/193.2 |
| 5,483,688 | A * | 1/1996 | English et al. | 455/184.1 |
| 5,745,844 | A * | 4/1998 | Kromer et al. | 455/193.1 |
| 6,081,700 | A * | 6/2000 | Salvi et al. | 455/193.3 |
| 6,236,842 | B1 * | 5/2001 | Kobayashi | 455/249.1 |
| 6,288,620 | B1 * | 9/2001 | Atokawa et al. | 333/103 |
| 6,466,774 | B1 * | 10/2002 | Okabe et al. | 455/150.1 |
| 6,529,088 | B2 * | 3/2003 | Lafleur et al. | 333/17.1 |
| 6,907,234 | B2 * | 6/2005 | Karr et al. | 455/193.1 |
| 2002/0105474 | A1 * | 8/2002 | Kitamura et al. | 343/850 |
| 2004/0137865 | A1 * | 7/2004 | Callias et al. | 455/179.1 |
| 2007/0142088 | A1 * | 6/2007 | Boh et al. | 455/562.1 |

FOREIGN PATENT DOCUMENTS

| | | |
|---|---|---|
| DE | 2753476 | 6/1979 |
| DE | 3504338 A1 | 8/1986 |
| DE | 69323995 T2 | 9/1999 |
| EP | 1231674 A2 | 8/2002 |

* cited by examiner

*Primary Examiner*—Simon D Nguyen
(74) *Attorney, Agent, or Firm*—Joseph J. Laks; Robert D. Shedd; Brian J. Cromarty

(57) ABSTRACT

In a circuit for reception of signals which have been modulated onto electromagnetic waves, an antenna arrangement (11) having a variable resonant frequency, a tunable oscillator, a variable gain amplifier, an evaluation circuit (14) and a decoder (13) are provided. The evaluation circuit (14) is supplied with the control signals of the oscillator (VT) and of the amplifier (VAGC) and with an error rate signal (BER) from the decoder (13). The resonant frequency of the antenna arrangement (11) is varied as a function of the signals which are applied to the evaluation circuit (14), such that the resonant frequency of the antenna arrangement (11) is matched to the respective reception conditions. This makes it possible to compensate for changes in the reception conditions, such as those which are caused, for example, by people or objects in the vicinity of the antenna arrangement (11).

3 Claims, 3 Drawing Sheets

RECEIVER CIRCUIT AND CONTROL METHOD

FIELD OF THE INVENTION

The invention relates to a circuit for reception of signals which have been modulated onto electromagnetic waves. In particular the circuit relates to a circuit for matching the resonant frequency of an antenna that is used in the circuit to the frequency of the signals to be received. The invention also relates to a control method for controlling the circuit according to the invention.

BACKGROUND OF THE INVENTION

Antennas for reception of electromagnetic signals may be represented as a resonant circuit which is tuned to the reception frequency, that is to say it resonates at the reception frequency. A simplified parallel resonant circuit, as is illustrated in FIG. 1, is formed by a capacitance 1 and an inductance 2. The resonant frequency $f_{res}$ of tuned circuits with inductances and capacitances is in general calculated using the formula:

$$f_{res} = \frac{1}{2\cdot\pi\cdot\sqrt{L\cdot C}} \quad (1)$$

If the capacitor 1 shown in FIG. 1 is visualized as being opened, this results in an opened tuned circuit with a predominantly electrical near field. The opened capacitor 1 is represented in FIG. 2 by its respective halves 1 and 1'.

If the capacitor 1 is retained, and an inductance 2 with a single turn is used, then this results in an opened tuned circuit with a predominantly magnetic near field. A tuned circuit such as this is illustrated in FIG. 3.

A tuned circuit such as that illustrated in FIG. 3 is frequently used for reception of electromagnetic waves and of signals which have been modulated onto them. In general, this antenna is also referred to as a frame antenna, in which case the conductor loop of the inductance 2 may also assume shapes other than those illustrated in the figure, for example a rectangle. The circumference of the single turn of the inductance 2 in this case typically corresponds to the wavelength of the signal to be received, or to half or one quarter of the wavelength.

FIG. 4 shows one known antenna arrangement with a conductor loop and capacitive outputting of the received signal. The received signal is output via coupling capacitances 3 and via a coupling transformer 4, which matches the impedance to the connecting line and produces an unbalanced signal from the balanced signal. The known antenna arrangement may also have a variable capacitance 1, so that the resonant frequency of the antenna circuit can be adjusted within a range.

FIG. 5 illustrates one known antenna circuit with a conductor loop in which the received signal is output inductively. An output loop 6 is provided for this purpose, and is connected via a coupling transformer 4 to a receiving circuit, which is not illustrated. The antenna arrangement illustrated in FIG. 5 may also have a variable capacitance 1, by means of which the resonant frequency can be adjusted within a range.

The variable capacitances 1 which are provided for the two antenna circuits illustrated in FIGS. 4 and 5 are normally formed by capacitance diodes. The capacitance of capacitance diodes can be varied by means of a control signal applied to them, typically a control voltage. In order to decouple any DC voltage that is used for control purposes from other circuit parts, coupling capacitors are often connected in series with the capacitance diode. When using capacitance diodes with a high capacitance variation ratio $C_{max}/C_{min}$ it is possible to make the upper cut-off frequency of the tunable range twice as great as the lower cut-off frequency.

Antenna configurations are also known in which a number of frequency ranges are split between the respective antenna circuits. One receiver circuit, which is connected to the respective two or more antennas, selects the antenna which is suitable for the frequency range to be received. These antennas have a higher tuned circuit Q-factor, thus resulting in better antenna selectivity. One such antenna configuration is illustrated in FIG. 6. The figure shows a first resonant circuit comprising the capacitance 1 and the inductance 2, as well as a second resonant circuit comprising the capacitance 1' and the inductance 2' connected by means of coupling capacitors 3 to switches 7. The switches 7 connect a respectively selected resonant circuit to a transformer 4, which matches the balanced antenna output to an unbalanced input of a receiver, which is not shown.

Another switchable antenna configuration, which is shown in FIG. 7, has only a single conductor loop 2. Coils 8 which are inserted into the conductor loop result in an effectively larger circumference of the conductor loop 2 than the actual geometric circumference. The coils can be entirely or partially bridged by means of switches 10, such that it is possible to switch between two or more effective coil circumferences. Two or more effective coil circumferences can be switched by means of an appropriate arrangement of switches, which is not shown. The other elements of the antenna circuit correspond to those shown in FIG. 6.

Particularly in the case of portable appliances, however, the antenna sizes are restricted by the size of the appliances and their handling convenience. Furthermore, in the case of both portable and stationary appliances, the reception situation varies continuously and quickly. This is due, inter alia, to the fact that objects or people in the vicinity of the antenna act like capacitances, which influence the tuning of the antenna. Owing to the very low antenna gain, broadband antennas are particularly disadvantageous in portable receivers, since the antenna geometry and the frequencies to be received are unfavourably related to one another.

It is thus desirable to produce an antenna circuit for a wide frequency range, which detects changes in the reception conditions and matches the antenna matching to the changed reception conditions.

SUMMARY OF THE INVENTION

One such receiving circuit is specified in claim 1. A control method for controlling the receiving circuit according to the invention is specified in claim 8. Advantageous developments and refinements of the invention are specified in the respective dependent claims.

The receiving circuit according to the invention has an antenna whose resonant frequency can be varied by means of a control signal. Furthermore, the receiving circuit has a frequency converter with a tunable oscillator and a variable gain amplifier. Signals which adjust the variable amplifier as well as the tunable oscillator are applied to an evaluation circuit. The evaluation circuit generates the control signal for controlling the antenna as a function of the signals which are applied to it. In a further development of the receiving circuit according to the invention, a decoder is provided, which decodes signals which have been modulated onto a carrier frequency. The decoder produces a signal which corresponds to the signal quality of the decoded signal. One decoder for use in the receiver circuit according to the invention by way of example, is an MPEG decoder. Decoders of the aforementioned type produce digital output signals, which have been provided with error correction information at the transmitter end. The received signals and the error correction information can be used to determine an error rate, for example a bit error rate BER or a block error rate BLER. The error rate is likewise supplied to the evaluation circuit, and is used for generation of the control signal for the antenna.

The method for operation of the receiving circuit according to the invention provides for the antenna first of all to be tuned roughly on the basis of the channel to be received, or of the corresponding frequency. This is done using the signal which sets the tunable oscillator to a desired frequency. The signal is, for example, a tuning voltage. A transformer transforms the output impedance of the antenna in a known manner such that the power is matched between the antenna output and the input of the receiver. A connecting line between the antenna output and the input of the receiver in this case has an impedance which corresponds exactly to the output impedance of the tunable antenna and to the input impedance of the receiver. If the antenna is mistuned as a result of changing reception conditions or environmental conditions, the output impedance of the antenna also changes. In this situation, the power is no longer matched, and this results in reflections and the formation of standing waves between the antenna and the receiver. The evaluation circuit identifies the changed reception condition on the basis, for example, of the control voltage for the controllable amplifier. As described above, the signal quality is also evaluated on the basis of the received and decoded signals. The error rates or error information which are or is derived from the received and decoded signals are or is likewise used for generation of the control signal for the antenna.

The changes in the reception conditions are generally unpredictable. In particular, it is not possible to predict whether the tuning of the antenna must be varied in the direction of lower or higher frequencies. In a further development of the method according to the invention, a low-frequency alternating or wobble signal is thus superimposed on the control signal for the antenna. The wobble signal varies the antenna matching cyclically in the direction of lower and higher frequencies. If the quality of the received signal becomes poorer when the tuning is varied in one direction, the wobble signal is changed such that the tuning takes place in a different direction.

In a further development of the method according to the invention, the wobble signal is not superimposed on the control signal for the antenna until the signal quality falls below a specific fixed or variable threshold value. When the signal quality is above the threshold value again, the wobble signal is not superimposed. The error rate or else the control signal for the variable amplifier are used, for example, as indicators of the signal quality.

BRIEF DESCRIPTION OF THE DRAWINGS

The invention will now be described with reference to the drawing, in which:

Identical or similar elements are provided with the same reference symbols in the figures. FIGS. 1 to 7 have already been explained further above, and will not be described again in the following text.

DETAILED DESCRIPTION OF PREFERRED EMBODIMENTS

Figure 1:
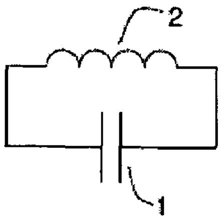
FIG. 1 shows an L-C resonant circuit.
Figure 2:
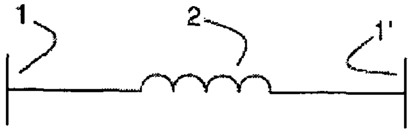
FIG. 2 shows a first opened L-C resonant circuit as an equivalent circuit of an antenna.
Figure 3:
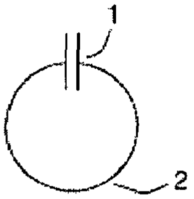
FIG. 3 shows a second opened L-C resonant circuit as an equivalent circuit of an antenna.
Figure 4:
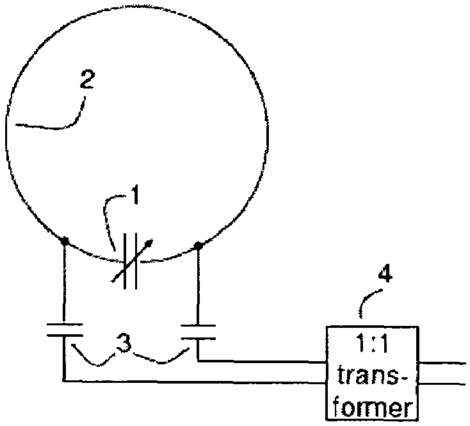
Fig. 4 Prior Art
FIG. 4 shows a known antenna circuit with a capacitive signal output.
Figure 5:
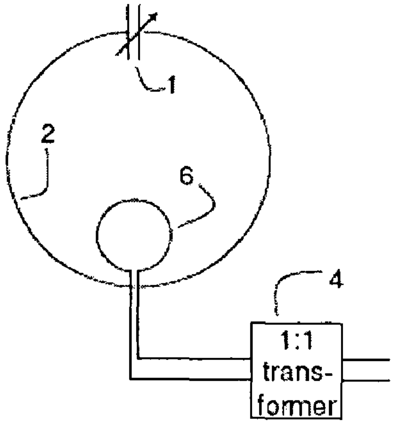
Fig. 5 Prior Art
FIG. 5 shows a known antenna circuit with an inductive signal output.
Figure 6:
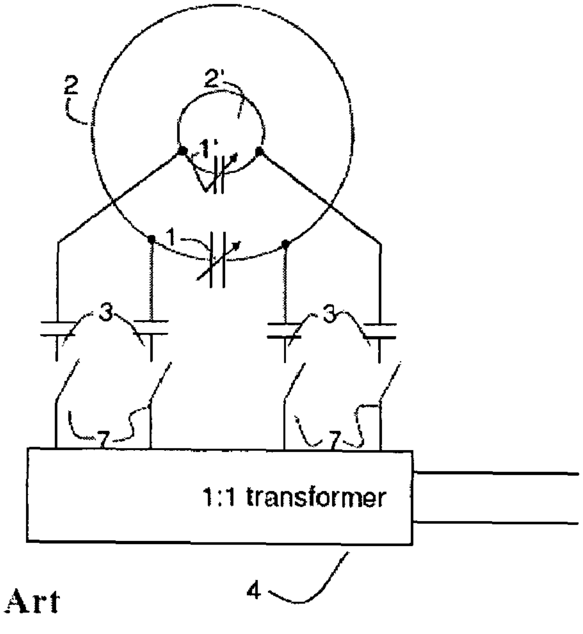
Fig. 6 Prior Art
FIG. 6 shows a known first switchable antenna circuit for various frequency ranges.
Figure 7:
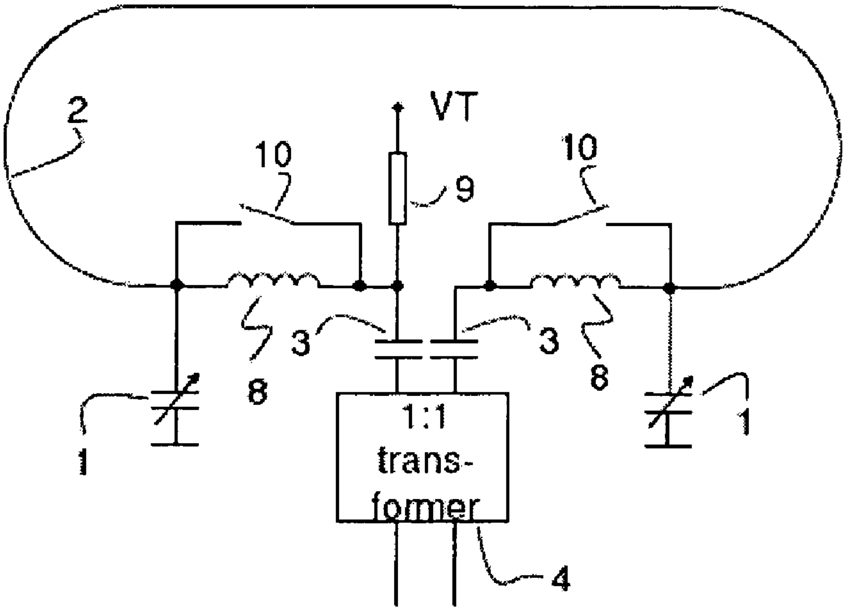
Fig. 7 Prior Art
FIG. 7 shows a known second switchable antenna circuit for various frequency ranges.
Figure 8:
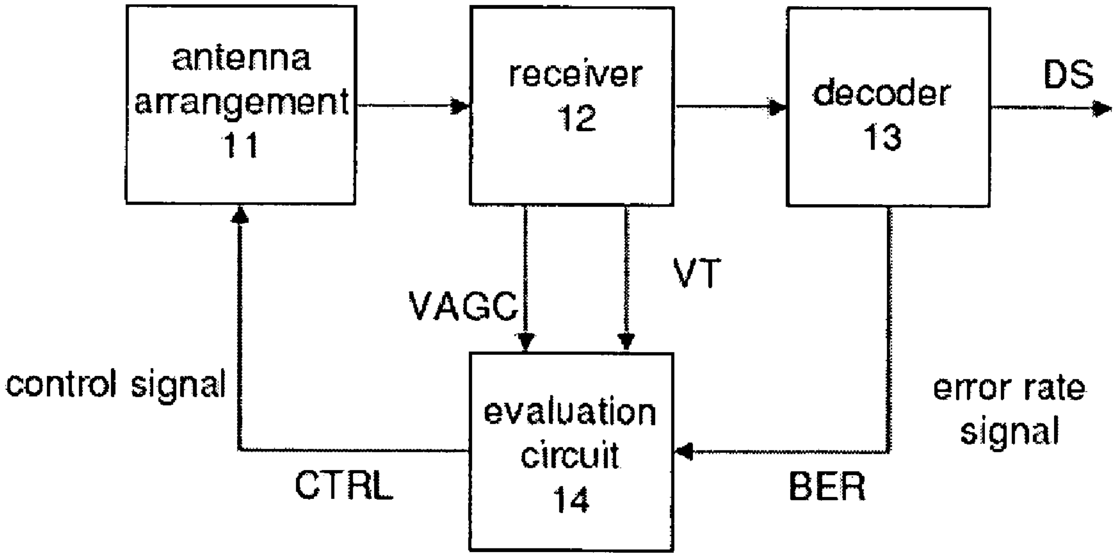
FIG. 8 shows a block diagram of a receiving circuit according to the invention.

FIG. 8 shows a block diagram of a receiving circuit according to the invention. An antenna arrangement 11 is connected to a receiver 12. The antenna arrangement 11 comprises, for example, an antenna with a transformer 4 as shown in FIG. 6 or 7. The transformer provides impedance matching of the antenna to the connecting line and to the downstream circuits, wherein the impedance matching may likewise be controllable. The receiver 12 comprises a tunable oscillator and a mixer as well as a variable gain amplifier. The output of the receiver 12 is connected to a decoder 13, at whose output the received useful signal DS is produced. An evaluation circuit 14 is supplied with signals VT and VAGC coming from the receiver 12. The evaluation circuit 14 is also supplied with a signal BER coming from the decoder 13. At its output, the evaluation circuit 14 produces a control signal CTRL, which is supplied to the antenna arrangement 11.

Figure 9:
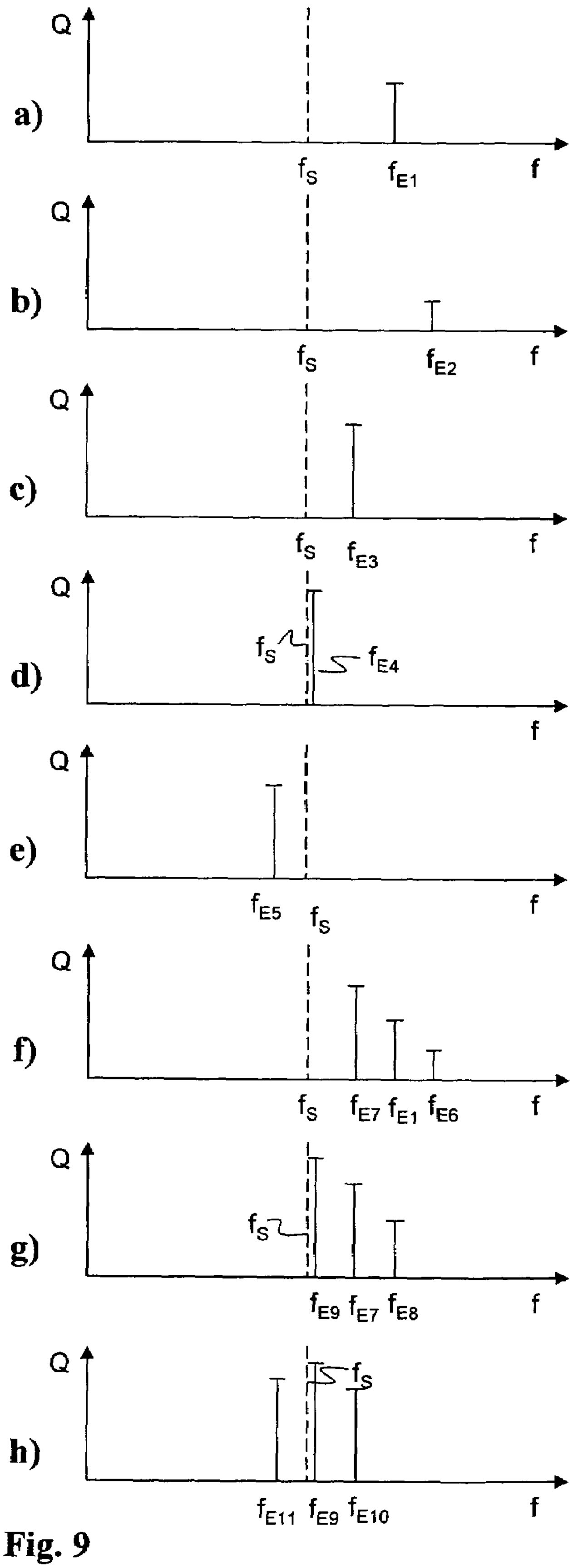
FIG. 9 shows a schematic step illustration of the method according to the invention.

The control method according to the invention will be described in the following text with reference to FIG. 9. FIG. 9*a*) illustrates the signal quality Q plotted against the frequency f. The nominal frequency $f_s$ is represented by a dashed line. It is now assumed that the resonant frequency of the antenna has been set to the nominal frequency $f_s$, that is to say to the frequency to be received, with the setting having been carried out, by way of example, on the basis of the tuning voltage VT of a frequency converter or of a tunable oscillator, or on the basis of a control variable that is proportional thereto. The evaluation circuit 14 produces the corresponding control signal CTRL for the antenna arrangement. The actual resonant frequency $f_{E1}$ of the antenna is, however, higher and the signal quality Q is poor as a result of external circumstances, for example as a result of people or objects in the vicinity of the antenna. The signal quality Q is indicated by the magnitude of the respective signal in the figure. The frequency converter has a control loop which regulates the level of the tuned-in signal to a specific magnitude. The signal VAGC that is used in this control loop is likewise evaluated by the evaluation circuit 14. By way of example, the resonant frequency of the antenna is not varied when the signal quality Q of the received signal is above a fixed or variable threshold value. The signal BER which is supplied to the evaluation circuit 14 is obtained from the received data and is, for example, an indicator of the bit error rate or of the block error rate. If the error rate BER or the control signal VAGC is above a fixed or variable threshold value, the evaluation circuit starts the active control process. It should be noted that the control method can also be carried out continuously, that is to say it is not absolutely essential to switch off the active control process.

In a first variant of the method, the resonant frequency of the antenna is first of all varied in the direction of a higher frequency. The new resonant frequency $f_{E2}$ is illustrated in FIG. 9*b*). The signals VAGC and BER which are now applied to the evaluation circuit are evaluated. The signal quality Q has become worse—represented by the shorter line for $f_{E2}$ in the figure. A new resonant frequency $f_{E3}$, which is lower than the previous resonant frequency $f_{E1}$, is thus set, starting from the previous resonant frequency $f_{E1}$. The signal quality Q is evaluated. As is shown in FIG. 9*c*), the signal quality is higher than for the resonant frequencies $f_{E1}$ and $f_{E2}$. The resonant frequency is now changed again in the same direction, and the antenna is set to the frequency $f_{E4}$. The signal quality Q is determined again. The longer line for $f_{E4}$ in FIG. 9*d*) indicates that the signal quality Q is better than before. If the signal quality Q is above a fixed or variable threshold value, the method can be interrupted, and the signal quality Q just needs to be detected until the threshold value is undershot once again.

In one embodiment of the method, which is shown in FIG. 9*e*), the resonant frequency is, however, changed again in the same direction as before. The new resonant frequency $f_{E5}$ is below the signal frequency $f_s$, and the signal quality Q is poorer than with the previous setting. The method can now set the previous resonant frequency $F_{E4}$ again, and can be stopped as described above, or the step width of the frequency change can be reduced, and the method can be carried out in its own right again.

In another variant of the method, the tuning of the antenna arrangement is permanently modulated with an alternating or wobble signal, for example a sinusoidal signal or a triangular-waveform signal. The changes are so small that no signal loss occurs, with this being ensured by the forward error correction that is transmitted with the signal. The initial state is assumed to be the state illustrated in FIG. 9*a*) once again. In FIG. 9*f*) an alternating signal is superimposed on the control signal which sets the resonant frequency of the antenna. To assist understanding, the figure shows new resonant frequencies $F_{E6}$ and $F_{E7}$ in addition to the selected resonant frequency $f_{E1}$ only for two extreme values of the alternating signal, with these new resonant frequencies respectively being higher or lower than the selected resonant frequency $f_{E1}$. The signal quality Q is determined and stored for all the frequencies or for specific frequencies while the antenna resonant frequency is being varied by the alternating signal, for $F_{E6}$ and $F_{E7}$ in the example shown in FIG. 9*f*). The stored values of the signal quality Q are evaluated after one complete oscillation of the alternating signal, that is to say after variation of the selected resonant frequency in both directions, in order to determine the frequency at which the signal quality Q was best. This frequency is set as the new resonant frequency, and the method is resumed from the start. As can be seen from FIG. 9*g*), the frequency $F_{E7}$ is set as the new resonant frequency, and the alternating signal leads to new values of the signal quality Q being recorded for frequencies $F_{E8}$ and $f_{E9}$. The resonant frequency has been adjusted again in FIG. 9*h*), and the method determines values for the signal quality Q for the frequencies $f_{E10}$ and $f_{E11}$. This variant of the method is particularly suitable for antennas whose resonant frequency is switchably variable, for example by means of further capacitances which are switchably associated with the variable capacitance 1, or by means of further inductances which are switchably associated with the inductance 2. However, as in the other variants, the resonant frequency can also be adjusted by variation of the control signal CTRL for the antenna. In this variant of the method as well, the step width may be variable, and it is also possible to provide, for this variant, for the method to be interrupted when the signal quality is above a threshold value.

For the sake of simplicity, the examples described above have been based on the assumption that the signal quality Q is improved the closer the resonant frequency of the antenna is to the frequency of the signal to be received.

The control signal VAGC for the variable amplifier is preferably used for fast control in the method and in the arrangement, and the error rate signal BER is used for slow control. It is also feasible for the step width of the changes to be made dependent on a single signal, for example on the signal VAGC.

The circuit according to the invention and the method are also suitable for antenna arrangements which have switchable resonant ranges. In this case, it is irrelevant whether the resonant ranges are selected by switching between separate antennas for different frequency ranges, or by switchable changes to the characteristics of an antenna.

What is claimed is:

1. A method for controlling a circuit for reception of signals that are modulated onto electromagnetic waves, the circuit including an antenna, a controllable amplifier, a frequency converter with a tunable oscillator, and a decoder decoding a digitally coded signal received by the antenna, the method including the steps of:

receiving a digitally coded signal;

generating a control signal indicative of the signal quality from the received and decoded digital signal;

applying the control signal to an antenna arrangement for varying the resonant frequency of the antenna arrangement;

varying the resonant frequency of the antenna first in one direction, starting from a previously set value;

determining, after said varying of the resonant frequency, the signal indicative of the signal quality; and if the signal indicates that signal quality is better than before said varying, effecting a further change in the same direction, and determining the signal quality again; or if the signal indicates that signal quality is poorer than before said varying, effecting a further change in the opposite direction, and determining the signal quality again;

wherein varying the resonant frequency is performed continuously.

2. The method of claim 1, wherein a low-frequency alternating signal is superimposed on the control signal, which control signal sets a current resonant frequency for the antenna arrangement, the superimposed alternating signal continuously modifying the resonant frequency centered around the set resonant frequency, and the superimposed alternating signal determining the direction of change of the resonant frequency with respect to the set resonant frequency, wherein values which represent the received signal quality are detected while the resonant frequency of the antenna arrangement is being varied, and wherein the detected values are stored, wherein a new frequency is determined from the stored values after one complete oscillation of the alternating signal, for which new frequency the signal quality is at its best, and wherein the control signal sets the new frequency as the current resonant frequency.

3. The method of claim 1, wherein the step width for the frequency tuning is variable.

* * * * *